Patented Oct. 11, 1927.

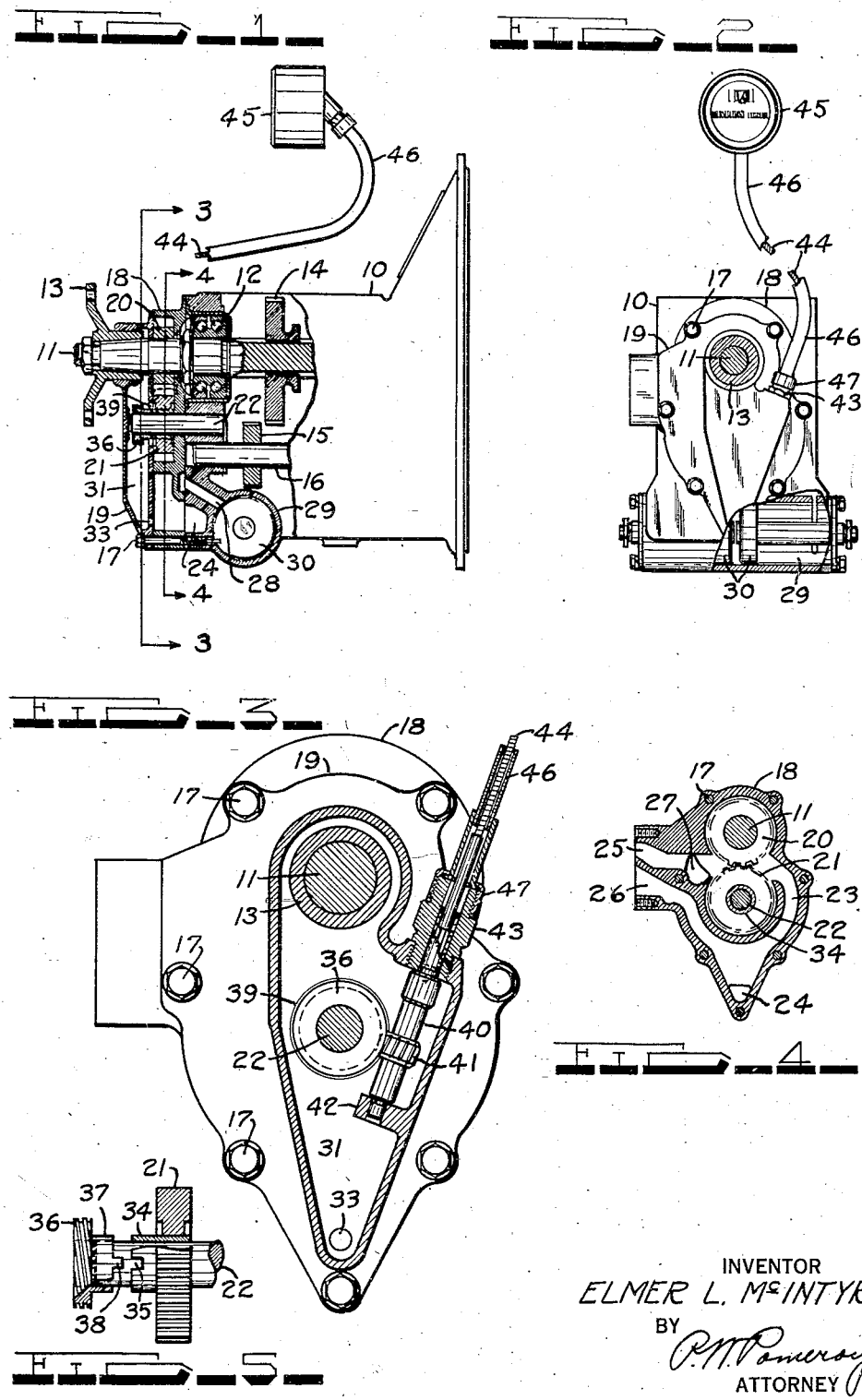

1,644,888

UNITED STATES PATENT OFFICE.

ELMER LLOYD McINTYRE, OF DETROIT, MICHIGAN, ASSIGNOR TO THE STUDEBAKER CORPORATION, OF SOUTH BEND, INDIANA, A CORPORATION OF NEW JERSEY.

SPEEDOMETER-DRIVE MECHANISM.

Application filed August 9, 1924. Serial No. 731,201.

This invention relates to motor vehicles and particularly to speed indicating mechanism therefor and the principal object is to provide a new, novel, and simple means for driving the same.

Another object is to provide in combination with a motor vehicle having an oil pump driven in direct relation to the speed of the driving wheels thereof, a gear driven by said oil pump for driving the speedometer.

A further object is to provide a novel speedometer driving mechanism for motor vehicles having an oil pump of the gear type adapted to operate various mechanisms on the vehicle, the oil pump comprising a casing enclosing a gear secured to and driven by the transmission shaft which meshes with and drives a second independently supported gear, the second gear being axially slidable but non-rotatably connected to a third gear adapted to drive the speedometer mechanism.

These above being among the objects of the present invention, the same consists of certain features of construction and combination of parts to be hereinafter described with reference to the accompanying drawing and then claimed, having the above and other objects in view.

In the accompanying drawing which illustrates a suitable embodiment of the present invention and in which like numerals refer to like parts throughout the several views, Figure 1 is a partially broken fragmentary side view of a motor vehicle transmission in which an embodiment of the present invention is incorporated.

Figure 2 is a partially broken view taken from the rear end of the transmission shown in Figure 1.

Figure 3 is an enlarged sectional view taken on the line 3—3 of Figure 1.

Figure 4 is a sectional view taken on the line 4—4 of Figure 1.

Figure 5 is an enlarged partially broken view of the oil pump driven gear and the speedometer drive gear slightly displaced from normal operative position to better illustrate the method of driving the latter from the former.

In the drawing is shown a transmission comprising a case 10 provided with the conventional flanged forward face which is adapted to be secured to and be supported by the rear face of a clutch housing, not shown in a conventional manner. A main transmission shaft 11 is rotatably supported by bearings such as 12 in the case 10 and is connected by the spider 13 secured to the tapered rear end thereof to the rear or driving wheels by means of a propeller shaft and axle shafts, the latter three parts not being shown and the construction of which is too well known in the art to require further description. Gears such as 14 slidably but non-rotatably mounted on the transmission shaft 11 are adapted to be brought into mesh with gears 15 rotatable with but not slidably mounted on the counter shaft 16, also supported by the case 10, for the purpose of varying the ratio of rotation of the engine in respect to the rear wheels. Secured to the rear face of the case 10 by the bolts 17 is a housing 18 and cover member 19.

The housing 18 is provided with a pocket surrounding the transmission shaft 11 in which is situated a gear 20 non-rotatably secured to the shaft 11. A second gear 21 meshing with the gear 20 is rotatably supported in another pocket in the housing 18 on the stub shaft 22 secured in the case 10 parallel to and below the shaft 11. These two gears 20 and 21 act as an oil pump of the conventional gear type, the intake side of which communicates through the passages 23 and 24 to the interior of the case 10 which normally carries a supply of oil for lubricating the transmission gears 14 and 15. A passage 25 is provided for leading the oil from the gears 20 and 21 to a point where it may be required which may be a valve control mechanism, and a passage 26 may be provided to return the oil passing through the gears 19 and 20 back to the suction side thereof. Valvular means, not shown, may be provided between the passages 25 and 26 to restrict or stop the passage of oil through the passage 26 back to the suction side of the gears and such valvular means as mentioned may be connected to be controlled either by the operator of the motor vehicle or automatically. It will, of course, be understood that when the valvular means described restricts the circulation of the oil through the passage 26, unless some other means are provided for the escape of the oil in the passage 25, it will be put under pressure. This pressure may be utilized for various purposes, but in the drawing it is communicated through the passage 27 which passes down the forward face of the casing 18 and joins the passage 28 to the cylinder 29 formed in the lower part of the case 10. Pistons 30 provided in the cylinder 29 are adapted to be actuated by such pressure and such actuation may be utilized to operate any suitable mechanism desired such as a brake, clutch, transmission, etc.

The cover member 19 is provided with a hollow interior 31 which extends up and around the transmission shaft 11 and the lower end of which communicates by the opening 33 with the passage 24 to catch and return to the pump any oil that may escape rearwardly along the shaft 11.

The gear 21 is provided with a bushing 34 which is non-rotatably secured therein and which projects out rearwardly therefrom and which projecting end is provided with one or more radial notches 35. A gear 36 provided with spiral or worm like teeth is rotatably journaled on the shaft 22 and is provided with a forwardly extending sleeve 37 having tongues 38 projecting forwardly therefrom which are adapted to enter the notches 35, thus effecting a driving connection between the gears 36 and 21. In the drawings the rear wall of the cover member 19 is shown positioned a small distance from the rear face of the gear 36, thereby preventing the gear 36 from backing away from the gear 21 enough to release the tongues 38 from the notches 35, but any other desirable means may be utilized to prevent such disengagement. It is preferable, however, that the gears be so designed that the thrust on the gear 36 due to driving the speedometer will cause it to tend to move further towards the gear 21. An opening 39 is provided in the front wall of the cover member 19 of sufficient size to admit passage of the gear 36 therethrough.

A shaft 40 disposed perpendicularly to the axis of the shaft 22 is provided with a gear 41 formed thereon to mesh with the gear 36 and is supported within the hollow interior 31 of the cover member 19 by the boss 42 at its lower end and by the bushing 43 at its upper end which is threaded into the wall of the cover member 19 and upon removal leaves an opening therethrough large enough to permit removal of the shaft 40 and gear 41. The upper end of the shaft 40 is provided with the conventional means for connection to a flexible shaft 44 which extends up to the speedometer 45 and transmits the movement of the gear 36 thereto for the purpose of driving the same, and a flexible casing 46 secured to the bushing 43 by a nut 47 is provided for surrounding and for holding lubricant for the shaft 44.

While I have shown a specific embodiment of my invention it is understood that formal changes may be made in the device described without departing from the spirit and substance of the broad invention, the scope of which is commensurate with the appended claims.

What I claim is:—

1. In a motor vehicle provided with a transmission comprising a casing and a shaft, a pump housing secured to said casing, a pump in said housing comprising a gear driven by said shaft and second gear driven by the first mentioned gear, a supplemental housing secured to said pump housing enclosing a third gear having axial connection with said second gear and held in driving relation therewith by contact with a wall of said supplemental housing, a cross shaft provided with a gear meshing with said third gear, and means for connecting said shaft with a speedometer.

2. In a motor vehicle provided with a transmission and a casing therefor, a pair of gears comprising an oil pump driven by the main shaft of said transmission, a housing enclosing said gears secured to an end face of said casing, one of said gears having an elongated bushing rotatably mounted thereon, a second shaft carried by said casing and projecting through said housing supporting said last-named gear and bushing, a supplemental housing supported on the first mentioned housing, means for driving a speedometer from said oil pump comprising a driving gear rotatably carried by said second shaft within said supplemental housing, said driving gear having toothed portions engaging with said bushing and held in engaged position by a wall of said supplemental housing, a driven gear supported by said supplemental housing angularly disposed relative to said driving gear and in meshing relation therewith, and a driving connection from said driven gear to said speedometer.

3. In a motor vehicle provided with a transmission comprising a casing and a main transmission shaft therein rotatable in direct relation to the speed of said vehicle and projecting beyond an end face of said casing, a second shaft spaced from said main shaft carried by and projecting past said end face of said casing, a housing surrounding said shafts secured to said casing, a gear in said housing secured against relative rotation to said main shaft, a second gear in mesh with the first mentioned gear and rotatably mounted on said second shaft, a supplemental housing secured to the first mentioned housing receiving the projecting end of said second shaft, a speedometer driving gear detachably clutched to said second gear and held in driving relationship therewith by a wall of said supplemental housing, and a speedometer driven gear carried by said supplemental housing in meshing relationship with said driving gear.

Signed by me at Detroit, Michigan, U. S. A., this 4th day of August, 1924.

ELMER L. McINTYRE.